No. 628,355. Patented July 4, 1899.
A. REIS.
WEED SEED DESTROYER.
(Application filed Sept. 17, 1898.)
(No Model.) 5 Sheets—Sheet 1.

WITNESSES:
M. D. Blondel
F. L. Stitt

INVENTOR
Adam Reis.
BY Munn & Co.
ATTORNEYS.

No. 628,355. Patented July 4, 1899.
A. REIS.
WEED SEED DESTROYER.
(Application filed Sept. 17, 1898.)
(No Model.) 5 Sheets—Sheet 3.

WITNESSES:
M. A. Blondel
F. S. Stitt

INVENTOR
Adam Reis.
BY Munn & Co
ATTORNEYS.

No. 628,355. Patented July 4, 1899.
A. REIS.
WEED SEED DESTROYER.
(Application filed Sept. 17, 1898.)

(No Model.) 5 Sheets—Sheet 4.

WITNESSES:
M. D. Blondel.
F. S. Stitt.

INVENTOR
Adam Reis
BY Munn & Co.
ATTORNEYS.

No. 628,355. Patented July 4, 1899.
A. REIS.
WEED SEED DESTROYER.
(Application filed Sept. 17, 1898.)
(No Model.) 5 Sheets—Sheet 5.

WITNESSES:
M. L. Blondel.
F. S. Hitt.

INVENTOR
Adam Reis.
BY Munn & Co.
ATTORNEYS.

UNITED STATES PATENT OFFICE.

ADAM REIS, OF GEORGETOWN, MINNESOTA.

WEED-SEED DESTROYER.

SPECIFICATION forming part of Letters Patent No. 628,355, dated July 4, 1899.

Application filed September 17, 1898. Serial No. 691,219. (No model.)

*To all whom it may concern:*

Be it known that I, ADAM REIS, of Georgetown, in the county of Clay and State of Minnesota, have invented a new and useful Improvement in Weed-Seed Destroyers, of which the following is a specification.

My invention relates to plows, and has for an object the production of a plow capable of making either a shallow or deep furrow, according to the adjustment of certain parts, in a simple and expeditious manner.

With this end in view my invention consists of a plow provided with a draft-frame, a plow-beam mounted to be raised and lowered on the frame, and a connecting device for connecting the front end of the plow-beam with the draft-frame when the beam is lowered, whereby to maintain a rigidity of the parts necessary for the strain to which they are subjected when making a very deep furrow.

The details of the invention and the construction and arrangement of the parts and combinations of the same will be first described and then particularly pointed out in the appended claims.

Reference is to be had to the accompanying drawings, forming part of this specification, in which—

Figure 1:
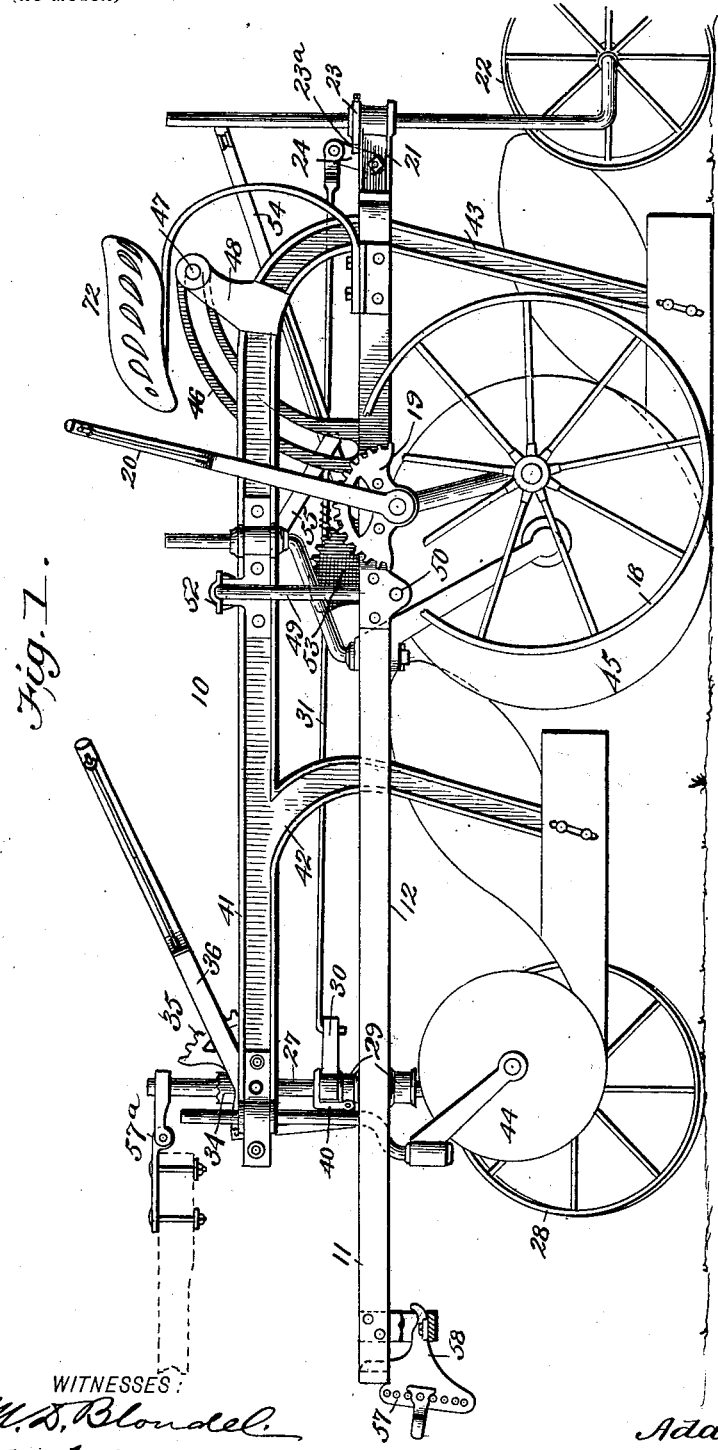
Figure 2:
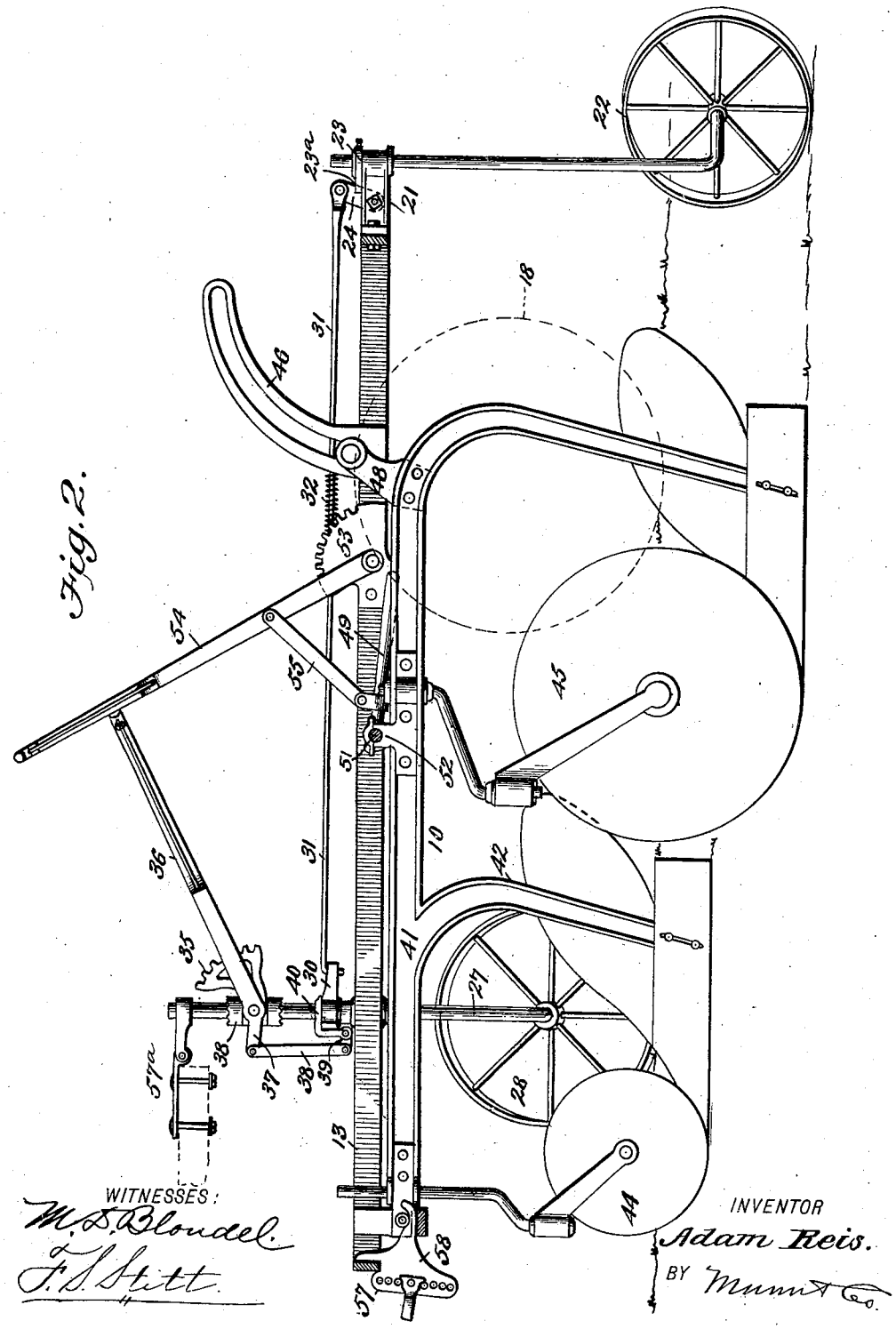
Figure 3:
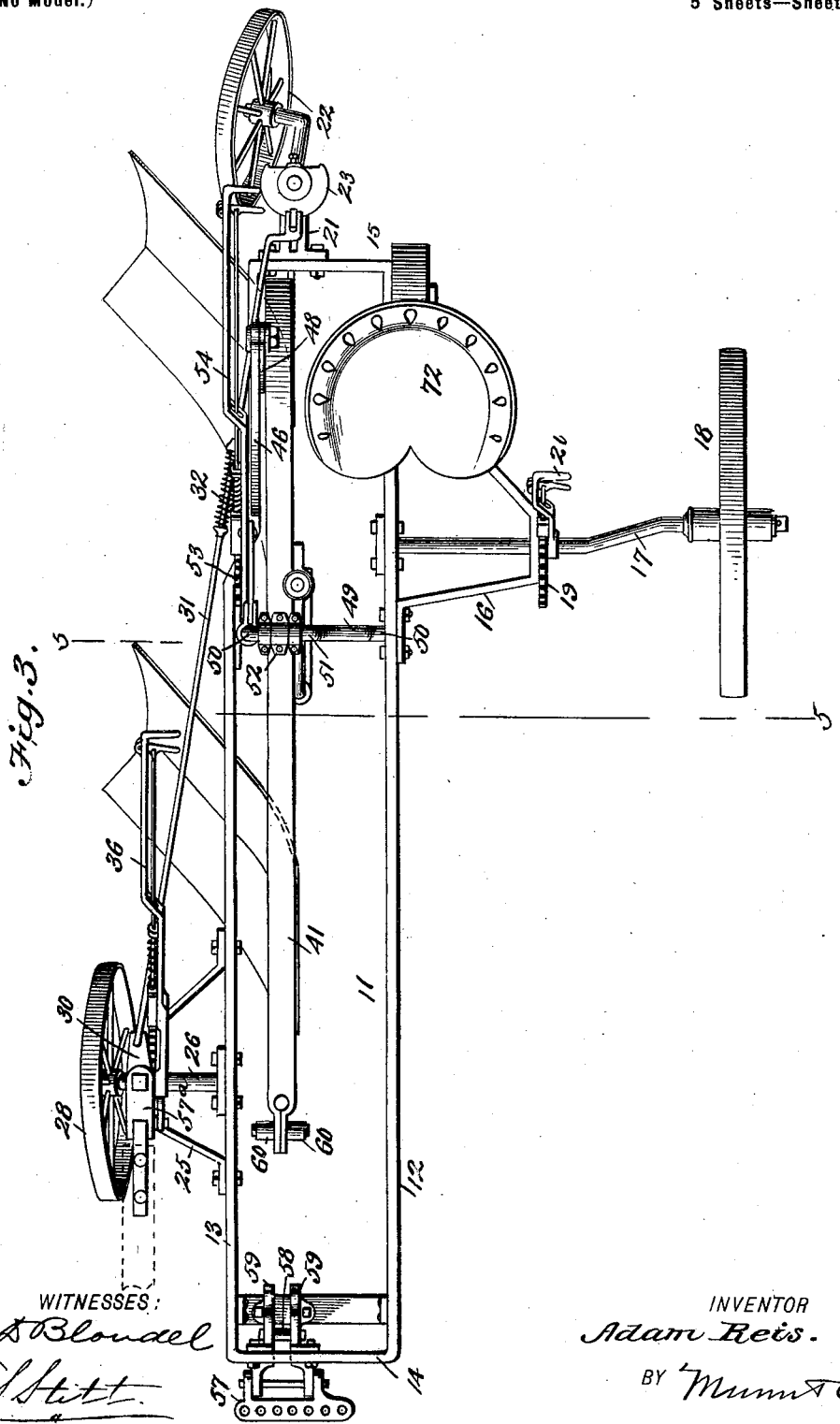
Figure 4:
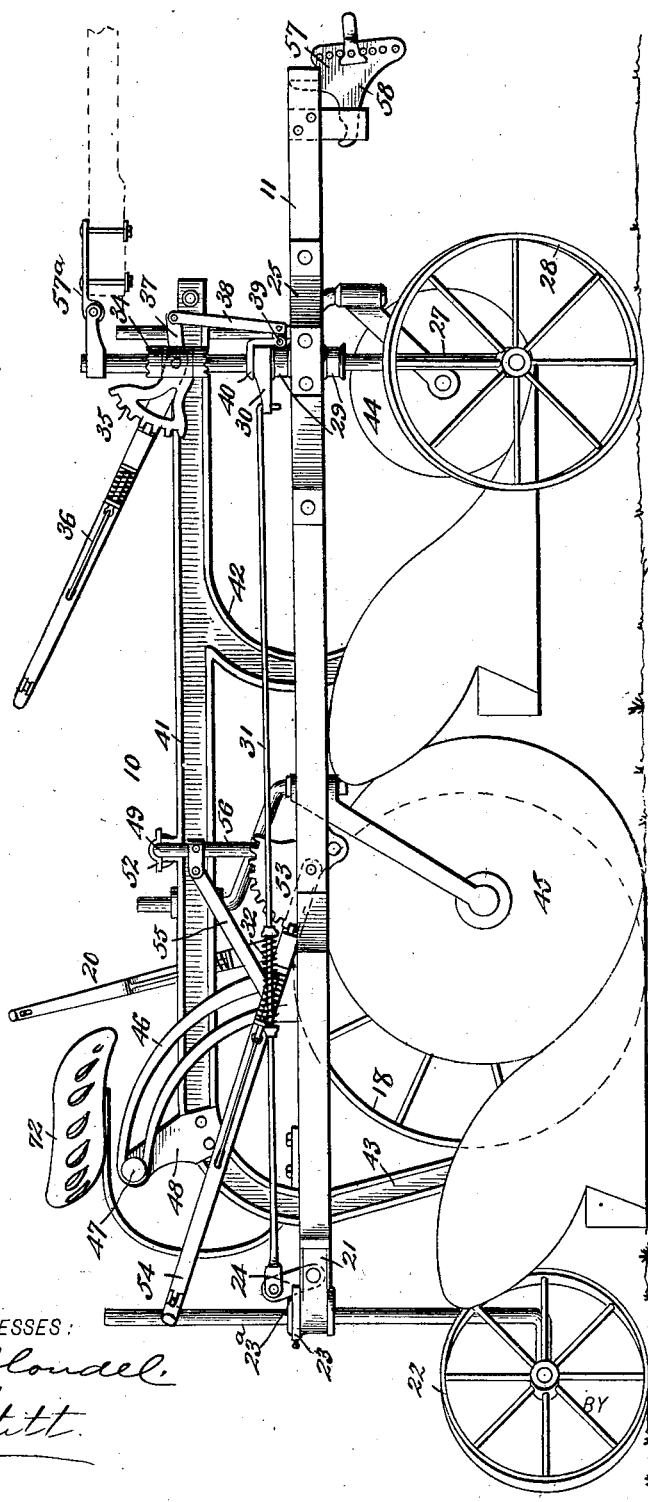
Figure 5:
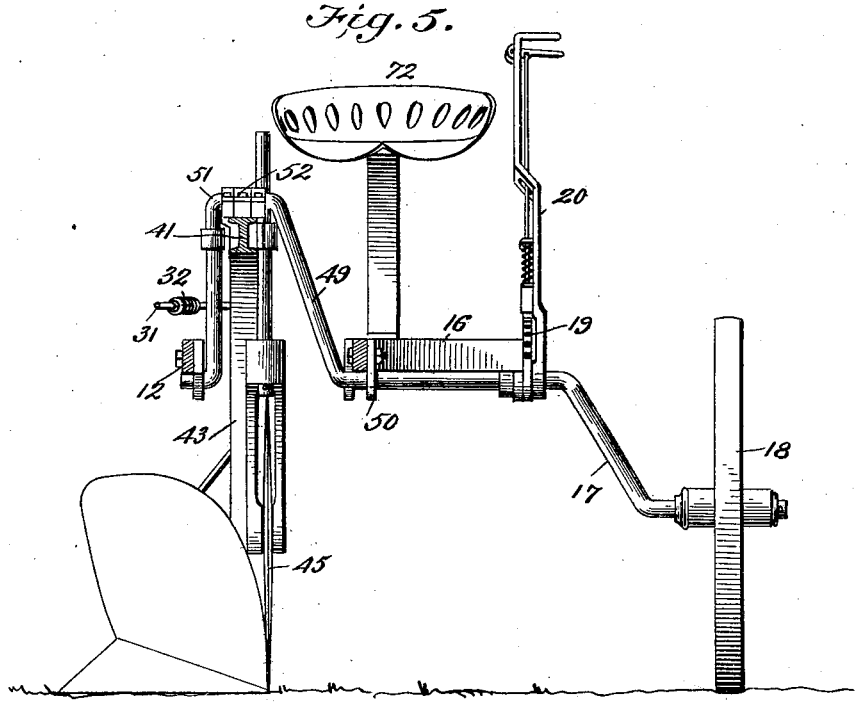
Figure 6:
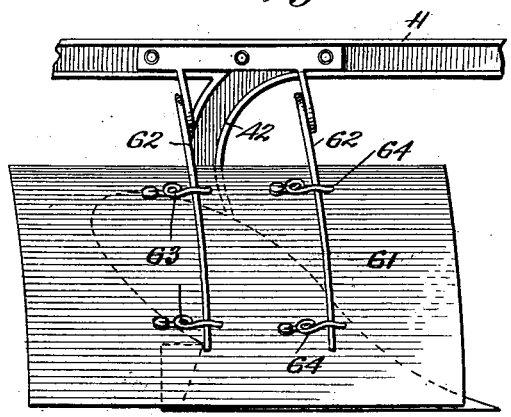
Figure 7:
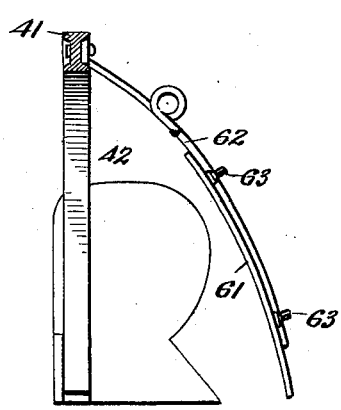

Figure 1 is a side elevation of my plow with the parts in an inoperative position. Fig. 2 is a similar view with the parts thrown down into working position. Fig. 3 is a plan view. Fig. 4 is a side elevation on the side opposite that shown in Figs. 1 and 2. Fig. 5 is a transverse section on line 5 5 of Fig. 3. Fig. 6 is a detail view illustrating the fender and mode of attaching the same, and Fig. 7 is a sectional view of the same.

The plow 10 is formed with a draft-frame 11, which is formed of a left side bar 12, right side bar 13, and front and rear cross-bars 14 and 15, respectively. To the left side bar 12 of the said frame is suitably secured a bracket 16, having at its outer end a bearing in which and a like bearing in the side bar is fitted the rock-shaft 17, on whose outer end is journaled the main traveling wheel 18. A segment 19 is rigidly secured to the outer end of this bracket 16, and a hand-lever 20 is attached to the rock-shaft 17 adjacent said segment and is provided with the usual spring-pressed pawl adapted to enter between the teeth on said segment. By this means the shaft is rocked to raise and lower the frame and hold the same at various elevations.

To the rear cross-bar 15 of the frame and adjacent the right side bar 13 is secured a bifurcated bracket 21, formed with a vertically-disposed bearing in which is keyed the shaft of the caster-wheel 22. A plate 23 is rigidly connected to the axis of said caster-wheel and is provided with a notch 23ᵃ on its front edge for a purpose to be presently described. Another bracket 25 is suitably secured to the right side bar 13, near the front thereof, and an arm 26 is secured between the said side bar and bracket, such arm being formed with a vertically-disposed bearing adapted to receive the shaft 27 of the supporting-wheel 28, and with collars 29, one above and one below the end of the bracket, said collars also receiving the shaft 27. Above the uppermost collar 29 is a crank-arm 30, secured on the shaft to turn therewith, but free to slide thereon, and to this crank-arm is pivotally connected a rod 31, the other end of said rod being pivoted to a link 24, pivoted between the arms of the rear bracket 21 and adapted to engage with the notch 23ᵃ. Now when the wheel 28 and its shaft turn the crank-arm 30 will turn and pull the rod 31 with it, thus drawing the line forward out of the notch and permitting the caster-wheel to turn; but when the plow is drawn in a straight line the crank-arm 30 being in the position shown in Fig. 1 will throw the link 24 in the path of the notch 23ᵃ, and when the caster-wheel is brought straight by the draft the link will enter the notch to hold the caster-wheel from turning. The connecting-rod is made slightly yielding by means of the coil-spring 32, held between studs 33 on overlapping sections of the connecting-rod.

In order to raise and lower the supporting-wheel 28 with respect to the frame, the shaft of said wheel has a sleeve 34 near its upper end, to which is rigidly secured the segment 35. The hand-lever 36 is also secured on the collar 34, but is pivotally connected therewith, and is provided with a finger 37, extending forward of its pivot, links 38 and 39 being pivoted to such finger, and to the link 39 is secured a collar 40, fitted on the shaft 27 above the crank-arm 30. Now it will be seen that in order to raise or lower the shaft 27 in its bearing it is necessary to retract the spring-pressed pawl of the hand-lever 36 from engagement with the segment and then raise or lower the hand-lever. If such lever is raised, the shaft will be raised by means of the links, and if it is lowered a corresponding lowering of the shaft will result.

I have above described the form and construction of the frame and the means whereby it may be raised and lowered as a whole. I shall now describe in detail the plow-beam and the arrangement of parts whereby it is adjustably mounted on the frame.

My improved plow-beam 41 is provided with two standards 42 and 43 in longitudinal alinement, the rear standard being extended below the forward standard. Each standard carries the usual plowshare and moldboard, and before each of which is a colter-wheel 44 and 45, having shafts suitably mounted in bearings on the plow-beam. On account of the rear standard being longer than the forward one it will be seen that the rear plowshare will ordinarily turn a deeper furrow than the forward plowshare when the beam is thrown in working position. On the left side bar 12 of the frame is secured the rearwardly-curved guide-bracket 46, in which is fitted to travel a pin 47, secured to an arm 48, rising from the beam 41, near the rear end thereof. In front of this guide-bracket is a rock-shaft 49, whose ends are journaled in the side bars of the frame at 50 and whose cross bar 51 is rotatably secured by clamps 52 to the plow-beam 41. A segment 53 is secured to the side bar 13 adjacent one point 50, where the rock-shaft 49 is mounted, a hand-lever 54 with spring-pressed pawl is pivoted to the side bar 13, and a link 55 connects the hand-lever with one side bar 56 of the said rock-shaft. It will now be understood that to throw the plow-beam into operative position it is only necessary to throw the hand-lever 54 forward, whereupon the shaft 49 will be rocked forwardly, and the beam itself will move forwardly and downwardly, the cross-pin 47 traveling in the guide-bracket 46. When the beam and plowshares, &c., are in this working position, (see Fig. 2,) it is necessary that the front of the beam be securely connected to the draft-frame, and to this end I have attached to the front cross-bar of the draft-frame a clevis 57, to which the draft is adjustably attached, and extending rearwardly from the clevis is a knuckle 58, formed with spaced-apart upturned fingers 59, adapted to engage with lugs 60 on the forward end of the plow-beam when the latter is in working position, as shown in Fig. 2.

In order to keep the seeds of weeds from spreading when the plow is being used to destroy weeds, I provide a fender 61, secured to the plow-beam alongside the forward plowshare by means of spring-arms 62, inserted in spring-clips 63 64, arranged to hold the fender in various positions.

The driver's seat 72 is secured on the side bar 12, near the rear thereof, where the driver may be in easy reaching distance of the hand-levers 20 and 54.

My plow as shown in Fig. 1 is in inoperative position. Now if it is desired to turn a shallow furrow with the rear plow alone, the shaft 17 is rocked by means of its hand-lever to lower the frame and bring the rear plowshare into working contact with the ground even though the plow-beam with respect to the frame is at its uppermost position. Again, to lower the plow-beam on the draft-frame to bring both plows into working position the shaft 49 is rocked by means of its hand-lever, the plow-beam is carried forwardly and downwardly, and the fingers on the clevis are caught over the lugs on the front end of the plow-beam. In either case the supporting-wheel 28 may be raised or lowered to correspond to the depth of the furrow turned on the slope of the ground over which the plow is working.

In order to turn the shaft of the supporting-wheel 28, I have provided it on the upper end with an arm 57ª, rigidly attached thereto and adapted to carry a pole, as shown in dotted lines. This pole is held between the horses, so that when the horses turn either to the right or left the pole will turn the supporting-wheel shaft to properly guide the plow.

It will be observed that I have produced a plow which while simple in construction and of comparatively few parts is capable of a wide range of usefulness.

Having thus described my invention, what I claim as new, and desire to secure by Letters Patent, is—

1. The combination with the draft-frame, of the plow-beam mounted to be raised and lowered on said frame, a clevis on said frame, and means for connecting the front end of said plow-beam with said clevis when the former is lowered, as set forth.

2. The combination with the draft-frame, of a plow-beam mounted to be raised and lowered on said frame, a clevis on said frame and provided with a rearwardly-extending knuckle adapted for connection with the front end of said beam when the latter is lowered, as set forth.

3. The combination with the draft-frame of the clevis secured thereto and provided with a rearwardly-extending knuckle formed with spaced-apart fingers, and a plow-beam having lugs projecting from its front end and arranged for connection with the said fingers, as set forth.

4. The combination with the draft-frame formed with an elongated slot, an arm provided with fastening devices by which it is adjustably held in said slot, and a tank for chemicals supported on said arm and provided with a spraying device, as set forth.

ADAM REIS.

Witnesses:
C. J. STEINE,
J. V. HOFFMAN.